(12) United States Patent
Loichinger et al.

(10) Patent No.: US 8,613,579 B2
(45) Date of Patent: Dec. 24, 2013

(54) SELF-DRILLING SCREW

(75) Inventors: Albert Loichinger, Sax (CH); Michael Baumgartner, Montlingen (CH); Sven Matthiesen, Lindau (CH)

(73) Assignee: Hilti Aktiengesellschaft, Schaan (LI)

( * ) Notice: Subject to any disclaimer, the term of this patent is extended or adjusted under 35 U.S.C. 154(b) by 1110 days.

(21) Appl. No.: 12/284,578

(22) Filed: Sep. 22, 2008

(65) Prior Publication Data

US 2009/0097941 A1    Apr. 16, 2009

(30) Foreign Application Priority Data

Oct. 11, 2007   (DE) .......................... 10 2007 000 848

(51) Int. Cl.
*F16B 25/10*    (2006.01)

(52) U.S. Cl.
USPC ..................... 411/387.8; 411/387.1

(58) Field of Classification Search
USPC ............ 411/386, 387.1, 387.2, 387.3, 387.4, 411/387.5, 387.6, 387.7, 387.8, 29, 393, 411/394, 411, 412, 413; 408/223–224
See application file for complete search history.

(56) References Cited

U.S. PATENT DOCUMENTS

| 3,093,028 | A | * | 6/1963 | Mathie | 411/387.4 |
|---|---|---|---|---|---|
| 3,288,015 | A | * | 11/1966 | Hanneman | 411/387.4 |
| 3,674,101 | A | * | 7/1972 | Chromy | 175/389 |
| 4,147,088 | A | * | 4/1979 | Whittaker, Jr. | 411/387.8 |
| 4,456,411 | A | * | 6/1984 | Clement | 408/223 |
| 4,605,347 | A | * | 8/1986 | Jodock et al. | 408/224 |
| 4,984,944 | A | * | 1/1991 | Pennington et al. | 408/223 |
| 5,120,172 | A | * | 6/1992 | Wakai | 411/387.8 |
| 5,314,272 | A | * | 5/1994 | Kubota | 408/224 |
| 5,442,979 | A | * | 8/1995 | Hsu | 76/108.6 |
| 5,520,491 | A |   | 5/1996 | Miyagawa | |
| 5,865,574 | A | * | 2/1999 | Tukala | 408/57 |
| 5,882,161 | A | * | 3/1999 | Birkelbach | 411/387.7 |
| 6,402,448 | B1 | * | 6/2002 | Dicke | 411/387.5 |
| 6,588,520 | B2 | * | 7/2003 | Hauptmann | 175/430 |
| 6,698,987 | B1 | * | 3/2004 | Dicke | 411/387.6 |
| 6,764,263 | B2 | * | 7/2004 | Carlo | 411/386 |
| 2004/0018069 | A1 | * | 1/2004 | Lai | 411/387.1 |

FOREIGN PATENT DOCUMENTS

DE    42 05 059    10/1992

* cited by examiner

*Primary Examiner* — Flemming Saether
(74) *Attorney, Agent, or Firm* — Abelman, Frayne & Schwab

(57) ABSTRACT

A self-drilling screw (10) has a first cutting edge (21) provided exclusively in a radially inner region of the drilling tip (12), extending at a first acute angle ($\alpha 1$) to the longitudinal axis (L), and a second cutting edge (22) provided in radially outer region of the drilling tip (12) and extending at a second acute angle ($\alpha 2$) to the longitudinal axis (L), with a first enveloping conical circumferential surface (A1) which is defined by the first cutting edge (21) corresponding, with a maximum deviation of +/−10%, to a second enveloping conical circumferential surface (A2) defined by the second cutting edge (22), and with the first acute angle ($\alpha 1$) corresponding, with a maximum deviation of +/−5°, to the second acute angle ($\alpha 2$).

7 Claims, 4 Drawing Sheets

SELF-DRILLING SCREW

BACKGROUND OF THE INVENTION

1. Field of the Invention

The present invention relates to a self-drilling screw having a shaft provided with a thread at least in some of its regions and defining a longitudinal axis, a drilling tip provided at one end of the shaft, a head provided at another, opposite end of the shaft, and at least one first cutting edge and at least one second cutting edge both provided in the drilling tip.

2. Description of the Prior Art

U.S. Patent Publication US 2004/0018069 discloses a self-drilling screw having a shaft, a head provided at one end of the shaft, and a drilling tip provided at the end of the shaft remote from the head. The drilling tip has a first cutting edge located in the radially outer region of the drilling tip, and a second cutting edge extending from a radially inner region to the radially outer region. The first cutting edge extends to the longitudinal axis of the self-drilling screw at a first acute angle, and the second cutting edge extends to the longitudinal axis at a second acute angle that is smaller than the first acute angle.

The drawback of such self-drilling screw consists in that the bore diameter can vary, dependent on an applied press-on force during the setting process of the self-drilling screw because at a small press-on force, the drilling tip can tumble. Therefore, at a small applied press-on force, a larger bore is formed, which leads to a smaller holding value.

Accordingly, an object of the present invention is to provide a self-drilling screw in which the drawback of the known self-drilling screw is eliminated, and a predetermined borehole diameter is provided over the entire borehole length.

Another object of the present invention is to provide a self-drilling screw that insures a more rapid drilling feed at a smaller press-on force.

SUMMARY OF THE INVENTION

These and other objects of the present invention, which will become apparent hereinafter, are achieved by providing a self-drilling screw in which at least one first cutting edge is provided exclusively in a radially inner region of the drilling tip. The at least one first cutting edge defines a first enveloping conical circumferential surface and extends at a first acute angle to the longitudinal axis. At least one second cutting edge is provided in the radially outer region of the drilling tip and defines a second enveloping conical circumferential surface. The at least one second cutting edge extends at a second acute angle to the longitudinal axis. The first enveloping conical circumferential surface corresponds, with a maximum deviation of +/−10%, to the second enveloping conical circumferential surface. The first acute angle corresponds, with a maximum deviation of +/−5°, to the second acute angle.

With a self-drilling screw according to the invention, application of a high pressure to each of the at least one first cutting edge and the at least one second cutting edge becomes possible at the beginning of a drilling process after penetration of the drilling tip into a to-be-drilled component. Simultaneously, a symmetrical distribution of the cutting force, which is independent from the pressure force, is achieved. The self-drilling screw according to the present invention permits to produce boreholes with a precisely determined diameter, which leads to a holding force of the set self-drilling screw, which is independent on the pressure force. The drilling feed is noticeably improved.

In a technically easily realisable embodiment of the invention, the first cutting edge extends, proceeding from an axial region of the drilling tip adjacent to the longitudinal axis, to a first radius, and the second cutting edge extends from an outer radius of the drilling tip toward the longitudinal axis up to a second radius. Thereby, due to a greater cutting depth, thicker chips are produced and a smaller surface on the chips is generated. As a result, a smaller cutting power is required, a smaller amount of heat is produced, and the self-drilling screw is subjected to a smaller wear, all of which leads to a reduced failure rate.

It is advantageous when the first radius and the second radius are equal to each other within a maximum tolerance of +/−20%.

Advantageously, the first radius is defined by an equation $$\text{first radius} = \text{outer radius} / \text{constant } x,$$

wherein the constant x has a value in a range from 1.1 to 1.7. With such a ratio, the radial force components of the cutting force, which act on separate cutting edges, are balanced off and, thereby, are increased. Therefore, bores with a precisely determined diameter are formed, without being influenced by the user action.

It is advantageous when the first and second cutting edges have a height above their respective cutting edge bases of from 0.05 mm to 0.5 mm. Thereby, the cutting edges can penetrate sufficiently deep into the drilled material.

It is further advantageous when the self-drilling screw has a third cutting edge provided at a free end of the drilling tip, extending transverse to the longitudinal axis and adjoining the first cutting edge radially outwardly. With a third cutting edge formed as a cross-cutting edge, a stable tip is formed that can operate, without being broken, at a start of a drilling process even at a high contact pressure.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
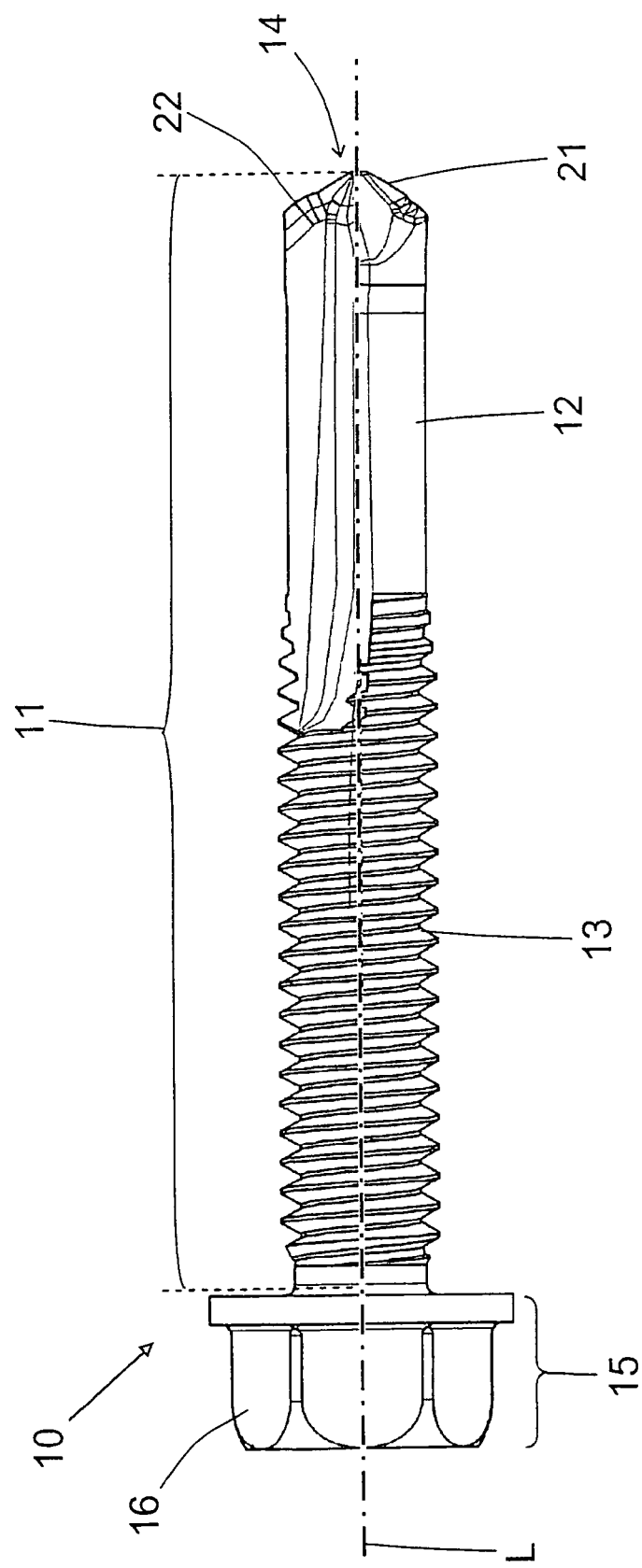
FIG. 1 a side view of a self-drilling screw according to the present invention.
Figure 2:
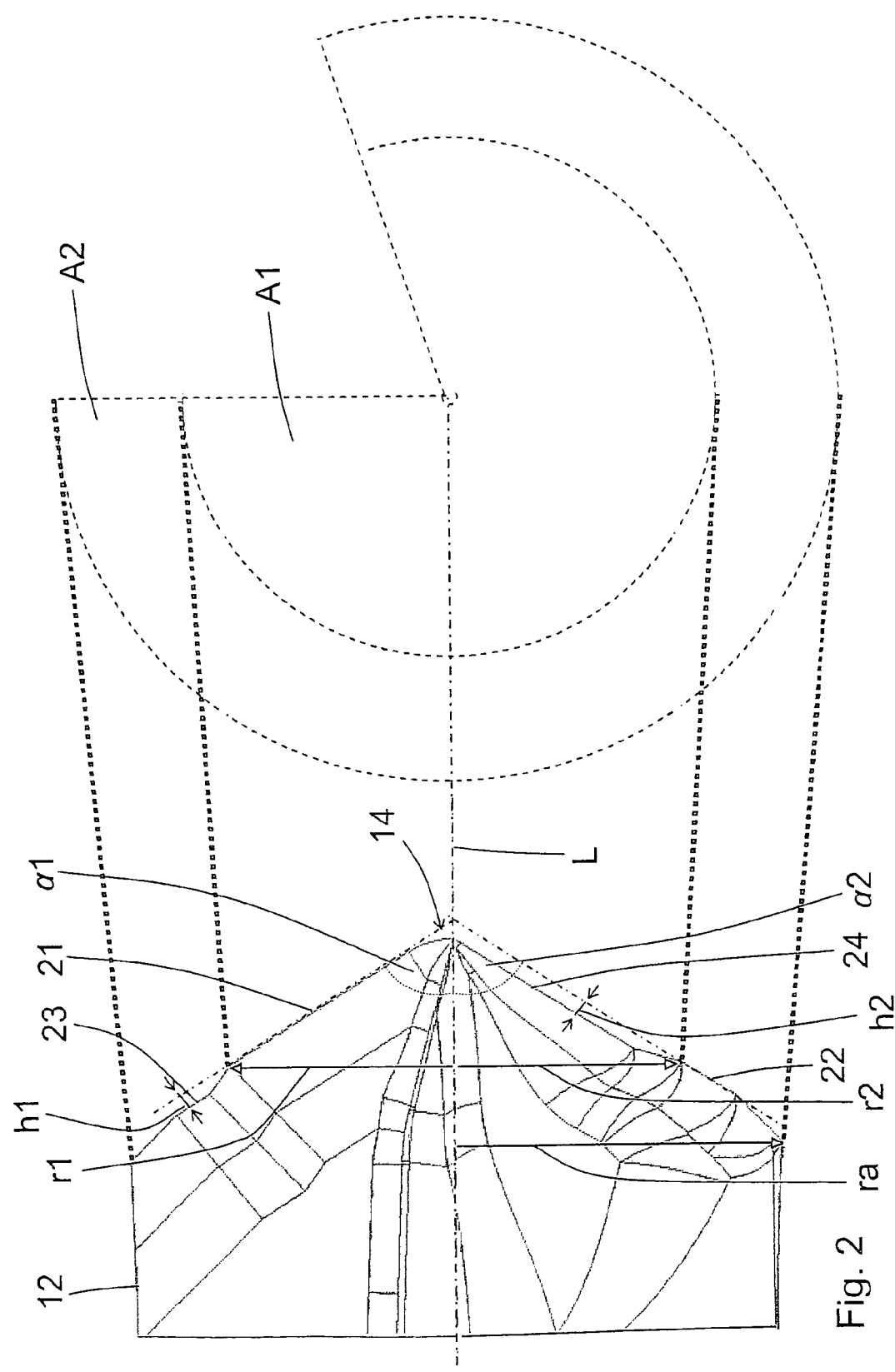
FIG. 2 a schematic view of the tip of the self-drilling screw shown in FIG. 1.
Figure 3:
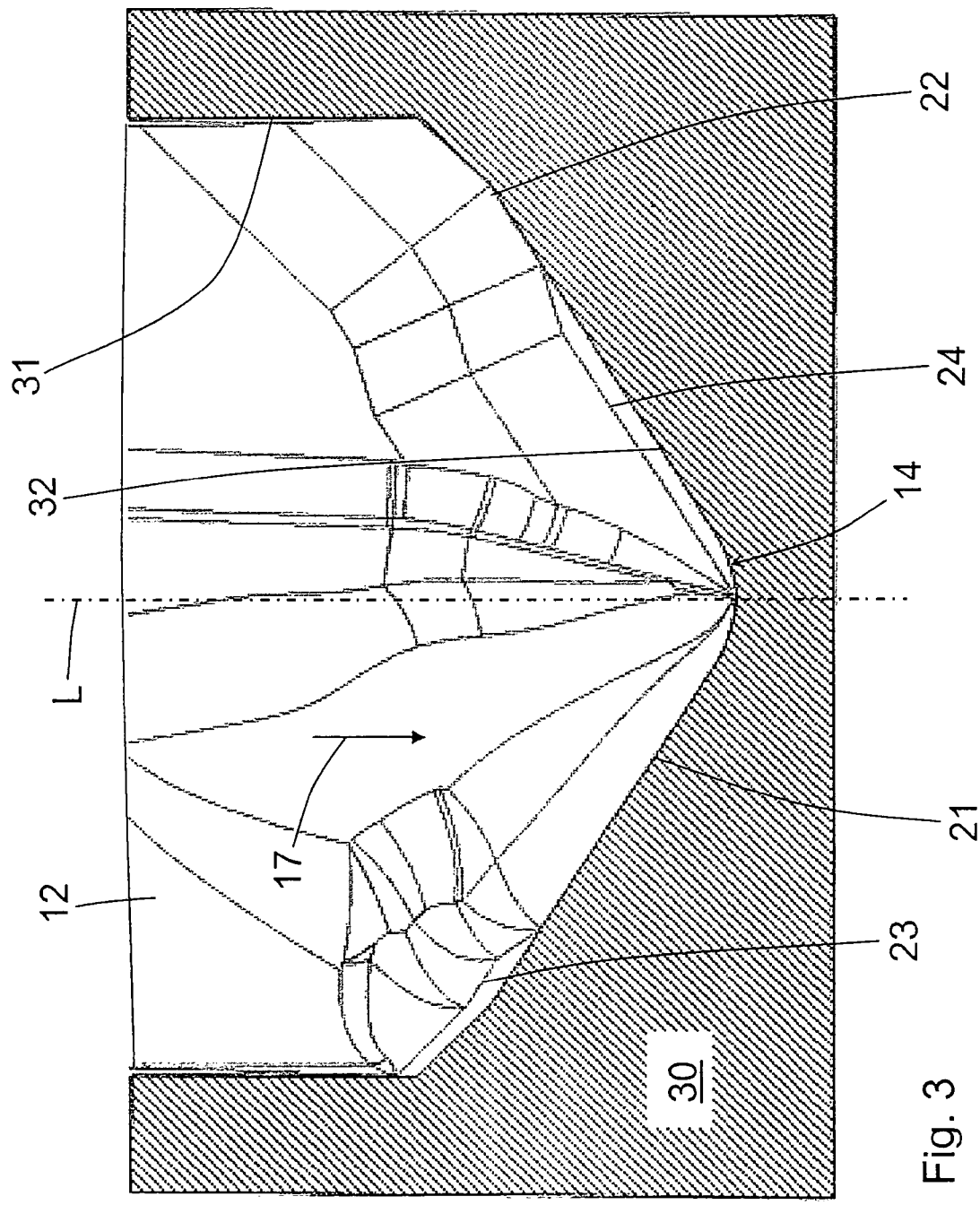
FIG. 3 a schematic view of the tip shown in FIG. 2 in a constructional component.

A self-drilling screw 10 according to the present invention, which is shown in FIGS. 1 through 3, has a shaft 11 carrying a thread 13, a drilling tip 12 provided at one end of the shaft 11, and a head 15 provided at an opposite end of the shaft 11. A longitudinal axis L of the self-drilling screw 10 defines an axial direction of the self-drilling screw 10. The head 15 is provided with rotation transmitting means 16 for a screwdriving tool. As a screwdriving tool, a screwdriving bit or wrench can be used.

The drilling tip 12 has at its free end 14 at least one first cutting edge 21 and at least one second cutting edge 22. The first cutting edge 21 is provided exclusively in a radially inward, with respect to the longitudinal axis L, region of the drilling tip 12, and the second cutting edge 22 is provided exclusively in the radially outer region of the drilling tip 12.

FIG. 2 shows two offset enveloping conical circumferential surfaces A1 and A2. The first cutting edge 21 defines a first enveloping conical circumferential surface A1 (that is spanned by the first cutting edge during rotation of the self-drilling screw 10) which corresponds, with a maximum deviation of +/−10%, to a second enveloping conical circumferential surface A2 defined by the second cutting edge 22.

The first cutting edge 21 extends to the longitudinal axis L at a first acute angle α1 that correspond, with a maximum deviation of +/−5°, to a second acute angle α2 at which the second cutting edge 22 extends to the longitudinal axis L. Further, the first cutting edge 21 and the second cutting edge 22 are arranged respectively on stepped edges (see in particular FIGS. 2-3) of the drilling tip 12 and have, respectively, a height h1 and h2 above their respective cutting edge bases 23 and 24 of, preferably, 0.05 mm to 0.5 mm. The heights h1 and h2 can also be of different sizes.

The surface of the enveloping conical circumferential surface A1 is defined by an equation Enveloping conical circumferential surface $A1 = (\text{first radius } r1) \times (\text{first radius } r1)/\sin \alpha 1 \times Pi$.

Proceeding from an axial region, adjacent to the longitudinal axis L, at the end 14 (see in particular FIG. 2) of the drilling tip 12, the first cutting edge 21 extends to the first radius r1, whereas the second cutting edge 22 extends from an outer radius ra of the drilling tip 12 toward the longitudinal axis L up to the second radius r2. The radius r1 and the r2 are preferably equal to each other within a tolerance of +/−20%.

The first radius r1 is defined by function first radius $r1 = \text{outer radius } ra/\text{constant } x$, wherein the constant x has a value in a range from 1.1 to 1.7.

FIG. 3 shows penetration of the drilling tip 12 of the self-drilling screw 10 (from FIG. 1) in a component 30 such as, e.g., a steel support, during a drilling process of forming a borehole 31. In a normal case, the cutting edges 21, 22 chip off and carry away the material of the component 30. The cutting edge bases 23, 24 are spaced from the inner wall 32 of the borehole 31 and, therefore, are not subjected to a load, so that a high press-on force can be applied to the projecting first cutting edge 21 and the second cutting edge 22 in the screw-in direction 17. At the start of the drilling, before immersion of the second cutting edge 22, the base 23 of the radially inner first cutting edge 21 can engage the component 30.

For reducing friction, the self-drilling screw can be provided, at least in the region of the shaft 11, with a friction-reducing coating such as, e.g., wax or oil.

It should be understood that instead of the shown two cutting edges 21, 22 more, e.g., three or four cutting edges can be provided. Thus, e.g., two located radially inwardly, first cutting edges, which are also radially offset relative to each other can be provided. Further, also two, located radially outwardly, second cutting edges can be provided, which likewise again are radially offset relative to each other.

Figure 4:
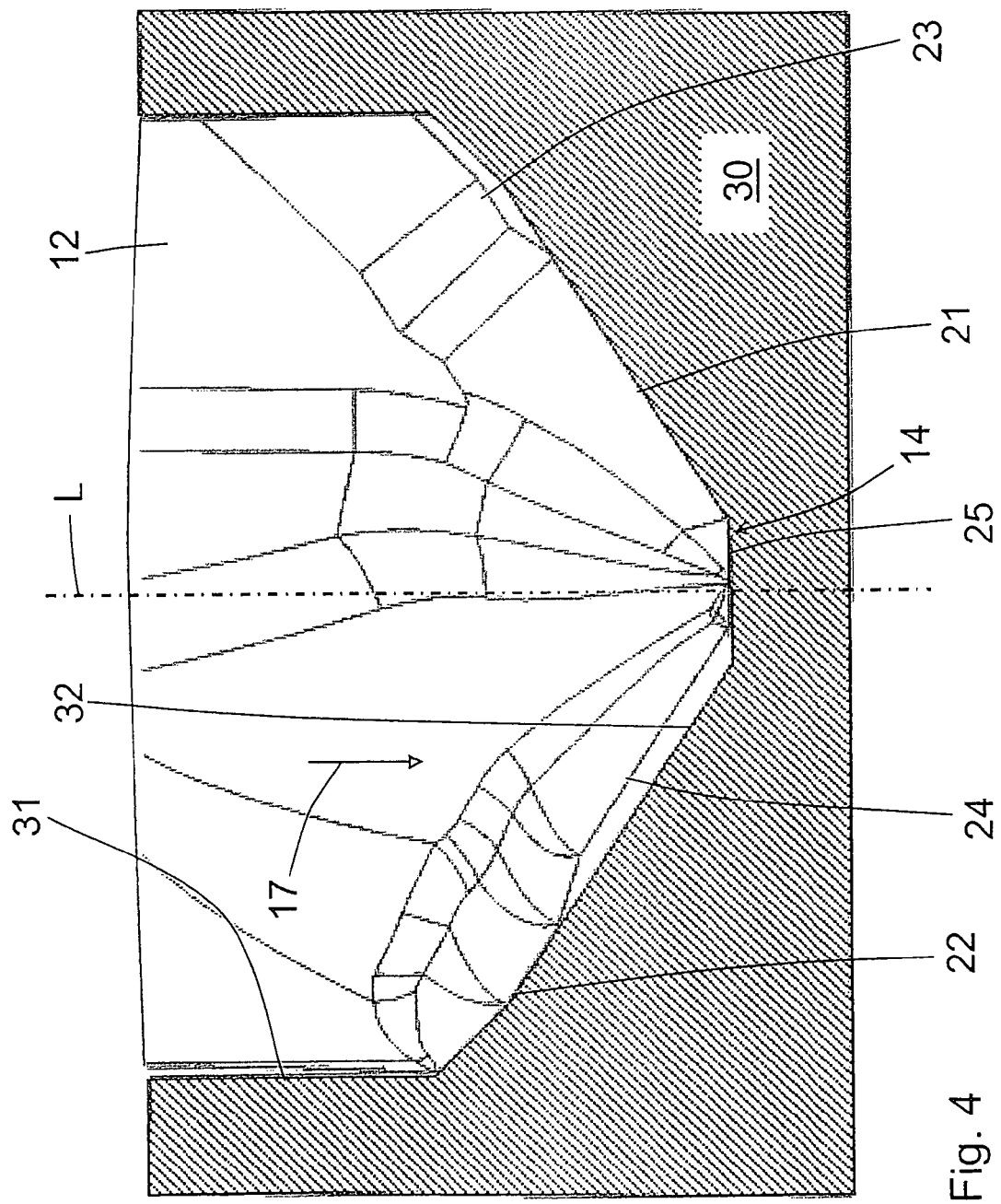
FIG. 4 a view similar to that of FIG. 3 of another embodiment of a self-drilling screw according to the present invention.

While, as particularly shown in FIGS. 2 and 3, the drilling tip 12 ends, at its free end 14, with a pointed tip, the drilling tip 12, which is shown in FIG. 4, has at its free end 14, at least one, extending transverse to the longitudinal axis L, third cutting edge 25 which is formed as a cross-cutting edge. The third cutting edge 25 adjoins the first cutting edge 21 radially outwardly thereof. Otherwise, the self-drilling screw shown in FIG. 4 has the same shape as the self-drilling screw 10 shown in FIG. 1 through 3. Therefore, for complete description of the elements shown in FIG. 4 reference should be made to description made with reference to FIGS. 1 through 3.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A self-drilling screw (10), comprising a shaft (11) provided with a thread (13) at least in some regions thereof and defining a longitudinal axis; a drilling tip (12) provided at one end of the shaft (11); a head (15) provided at another, opposite end of the shaft (11); a first cutting edge (21) provided exclusively in a radially inner region of the drilling tip (12), defining a first enveloping conical circumferential surface (A1), and extending at a first acute angle (α1) to the longitudinal axis (L); and a second cutting edge (22) provided in a radially outer region of the drilling tip (12) defining a second enveloping conical circumferential surface (A2), and extending at a second acute angle (α2) to the longitudinal axis (L), wherein the first cutting edge has a radially outer region (23) which is not equal to the second cutting edge (22), and the second cutting edge (22) having a radially inner region (24) which is not equal to the first cutting edge (21).

2. A self-drilling screw according to claim 1, wherein the first cutting edge (21) extends, proceeding from an axial region of the drilling tip (12) adjacent to the longitudinal axis (L), to a first radius (r1) and the second cutting edge (22) extends from an outer radius (ra) of the drilling tip (12) toward the longitudinal axis (L) up to a second radius (r2).

3. A self-drilling screw according to claim 2, wherein the first radius (r1) and the second radius (r2) are equal to each other within a maximum tolerance of +/−20%.

4. A self-drilling screw according to claim 2, wherein the first radius (r1) is defined by an equation first radius $r1 = \text{outer radius } ra/\text{constant } x$, wherein the constant x has a value in a range from 1.1 to 1.7.

5. A self-drilling screw according to claim 1, further comprising a third cutting edge (25) provided at a free end (14) of the drilling tip (12), extending transverse to the longitudinal axis (L), and adjoining the first cutting edge (21) radially outwardly.

6. A self drilling screw according to claim 1, wherein the first enveloping conical circumferential surface (A1) is equal, with a maximum deviation of +/−10%, to the second enveloping conical circumferential surface (A2).

7. A self drilling screw according to claim 1, wherein the first acute angle is equal, with a maximum deviation of +/−5°, to the second acute angle (α2).

\* \* \* \* \*